United States Patent [19]

Mabuchi

[11] Patent Number: 4,843,272

[45] **Date of Patent: *Jun. 27, 1989**

[54] MINIATURE MOTOR HAVING RESILIENT BRUSH ARMS

[75] Inventor: Kazuichi Mabuchi, Matsudo, Japan

[73] Assignee: Mabuchi Motor Co., Ltd., Japan

[21] Appl. No.: 57,952

[22] Filed: Jun. 4, 1987

[*] Notice: The portion of the term of this patent subsequent to Jul. 19, 2005, has been disclaimed.

Related U.S. Application Data

[63] Continuation-in-part of Ser. No. 755,069, Jul. 15, 1985.

[51] Int. Cl.$^4$ .............................................. H02K 13/00

[52] U.S. Cl. ...................................... 310/239; 310/45; 310/242; 310/248

[58] Field of Search ............... 310/248, 249, 245, 246, 310/251, 252, 247, 71, 40 MM, 239, 51, 241, 242, 244, 43, 45, 233; 336/205

[30] Foreign Application Priority Data

Jul. 26, 1984 [JP] Japan ...................................... 155,923

[56] References Cited

U.S. PATENT DOCUMENTS 4,758,757 7/1988 Okumura ............................ 310/51

FOREIGN PATENT DOCUMENTS 0108203 8/1979 Japan .................................. 310/248
0117455 9/1980 Japan .................................. 310/251
0050750 3/1984 Japan .................................. 310/51

OTHER PUBLICATIONS

McGraw-Hill Dictionary of Scientific and Technical Terms; Third Edition; Sybil P. Parker; McGraw-Hill Book Co.; New York; 1984; 4 pages.

*Primary Examiner*—R. Skudy
*Attorney, Agent, or Firm*—McGrew & Tuttle

[57] ABSTRACT

A miniature motor having brushgear comprising brush arms with sliding parts on the tips thereof, terminals and brush bases; the brush bases being supported by a motor case cover plate, when the terminals are inserted in brush holes provided on the motor case cover plate; the sliding parts being brought into sliding contact with a commutator by the resiliency thereof, and characterized in that a flexible photo-setting resin having similar resiliency to the resiliency of vibration-damping rubber is applied to the brush arms to prevent the brushes from unwantedly vibrating during rotation of the commutator.

5 Claims, 4 Drawing Sheets

MINIATURE MOTOR HAVING RESILIENT BRUSH ARMS

This application is a continuation-in-part of Ser. No. 755,069,filed July 15, 1985.

BACKGROUND OF THE INVENTION

This invention relates generally to a miniature motor, and more particularly to a miniature motor in which a flexible photo-setting resin is applied to brush arms to prevent brushes from unwantedly vibrating during rotation of a commutator.

In recent years, miniature motors are being widely used as drive motors in audio, optical, office and other various types of equipment.

FIG. 3(A) is a partially cut-away side elevation of an example of a miniature motor, and FIG. 3(B) is a diagram of assistance in explaining the state where brushes are supported by a motor case cover plate in a miniature motor.

In FIG. 3(A) and (B), reference numeral 1' refers to a brush arm; 2' to a brush based end or brush base; 3' to a terminal; 4' to a motor case; 5' to a motor case cover plate; 6' to a bearing; 7' to a brush receiving recess or hole; 8' to a rotor; 9' to a commutator; 10' to a magnet; 11' to a shaft; and 12' to a shaft hole, respectively.

As shown in FIG. 3(A), the shaft 11' to which the rotor 8' and the commutator 9' are fixedly fitted is rotatably supported by the bearings 6' provided on the motor case 4' and the motor case cover plate 5', and housed in the motor case 4' having therein the magnet 10'. The brush arm or brush motor arm 1' for making electrical contact with the commutator 9' is fixedly fitted onto the motor case cover plate 5' in such a manner that the brush base or brush base end 2' is inserted into and engaged with the brush hole 7' provided on the motor case cover plate 5', as shown in FIG. 3(B).

The brush arm 1' fitted in the aformentioned state, when making sliding contact with the commutator 9', tends to cause chattering due to the vibration caused by irregular surfaces of commutator segments, leading to unwanted phenomenon, such as lowered commutating performance. To prevent such unwanted phenomena, it has heretofore been practiced that a rubber plate or film is applied to the brush arm 1' as a vibration-damping means with rubber or acrylic adhesive.

FIG. 2(A) is a front view of a vibration-damping device of the conventional type in which a rubber plate is applied to the brush arm, and FIG. 2(B) is a side elevation of the same.

In the figures, reference numeral 1' refers to a brush arm; 13' to a rubber plate, 14' to a prong of the brush arm 1', respectively.

When a vibration-damping rubber plate 13' is applied to the fork-shaped brush arm 1', the rubber plate 13' adheres to all of the prongs 14' of the brush arm 1, decreasing the resiliency of each prong 14'. This makes it difficult to allow independent movement of each of the prongs 14'. This results in a loss of the intimate contact of the fork-shaped brush arm 1' with the commutator, and accordingly to a loss of the spark-quenching effect that would otherwise be improved by the multi-point contact of the brush arm 1' with the commutator. Furthermore, the conventional vibration-damping means involves an additional process of applying the rubber plate 13' to the brush arm 1'.

SUMMARY OF THE INVENTION

This invention is intended to overcome the aforementioned problems.

It is the first object of the invention to provide a miniature motor having brushgear comprising brush arms with sliding parts of the tips thereof, terminals and brush bases; the brush bases being supported by a motor case cover plate, when the terminals are inserted into brush holes provided on the cover 5; the sliding parts being brought in sliding contact with a commutator by the resiliency thereof in which a flexible photo-setting resin is applied to the brush arms.

It is the second object of this invention to provide a miniature motor having brushgear in which a flexible photo-setting resin is applied to one side of fork-shaped brush arms, excluding the portions thereof for making electrical contact with the commutator.

It is the third object of this invention to provide a miniature motor having brushgear in which the flexible photo-setting resin is applied not only to one side of the fork-shaped brush arms, exclusing the portion thereof which make electrical contact with the commutator, but also to the areas near the brush holes.

It is the fourth object of this invention to provide a miniature motor having brushgear in which the area to which the flexible photo-setting resin is applied is extended further to the inside of the brush holes.

It is the fifth object of this invention to provide a miniature motor having brushgear in which dampers are applied to the base of the prongs of the brush arms, and a flexible photo-setting resin is applied to the prongs, including part of the dampers.

The various features of novelty which characterize the invention are pointed out with particularity in the claims annexed to and forming a part of this disclosure. For a better understanding of the invention, its operating advantages and specific objects attained by its uses, reference is made to the accomanying drawings and descriptive matter in which preferred embodiments of the invention are illustrated.

DETAILED DESCRIPTION OF THE INVENTION

Figure 1A:
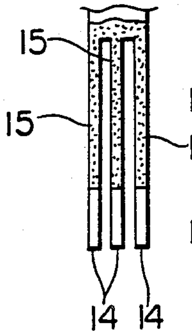
FIG. 1(A) is a front view of a brush arm according to a first embodiment of the present invention.

In accordance with the invention, as seen in

FIGS. 1A, 1B, 4, 5A, 5B, 5C, 5D and a miniature motor comprises a motor case which includes a motor case portion 4 and a cover 5 which is provided with a rotatable shaft 11 having a rotor including an armature part or rotor 8 and a commutator 9 supported on bearings 6,6 for rotation within the case. A casing wall comprising the cover 5 is provided with a hole or brush receiving recess 7 in which is engaged an end of a commutator brush 1. In accordance with a feature of the invention, the commutator brush has a resilient fork-shaped commutator engaging sliding part end or brush arm 1 which is disposed in biased bearing contact against the commutator 9 and it also has an opposite or brush base 2 with a porton thereof engaged in the brush receiving recess 7, so as to hold the fork-shaped end in sliding engagement with the commutator. The terminal 3 is engaged in the wall 5 and may be electrically connected with the brush. In accordance with a feature of the invention, a photosetting resin covers the brush at least over the brush base end thereof.

Figure 1B:
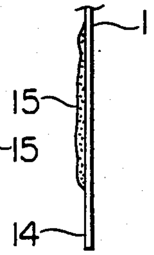
FIG. 1(B) is a side view of the brush arm shown in FIG. 1(A)
Figure 2A:
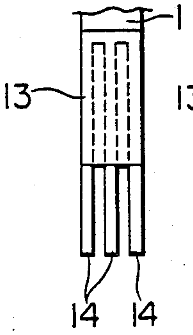
FIG. 2A (PRIOR ART)
FIG. 2(A) is a front view of a vibration-damping device of the conventional type in which a rubber plate is applied to a brush arm.
Figure 2B:
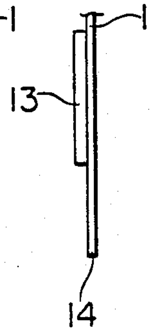
FIG. 2B (PRIOR ART)
FIG. 2(B) is a side elevation view of the conventional brush arm showing FIG. 2(A)
Figure 3A:
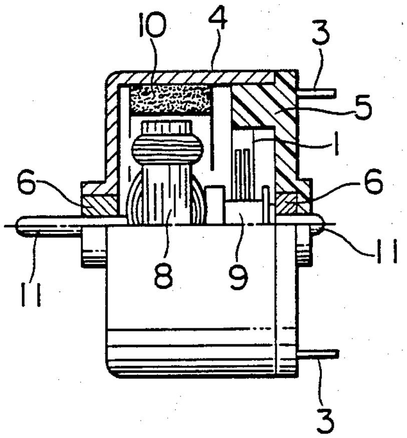
FIG. 3A (PRIOR ART)
FIG. 3(A) is a partially cut-away side elevation of an example of a miniature motor.
Figure 3B:
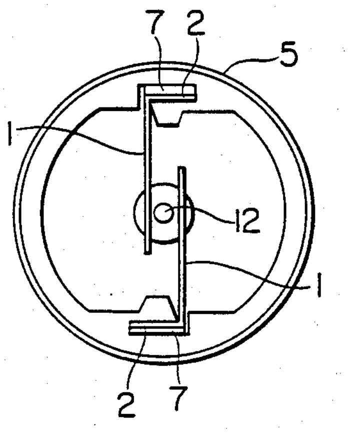
FIG. 3B (PRIOR ART)
FIG. 3(B) is a portion of a conventional brush and brush support assembly with a motor case cover plate of an inventional miniature motor.

In FIG. 1(B), numeral 1 refers to a brush arm; 14 to a prong; 15 to a flexible photo-setting resin, respectively.

In the first embodiment of this invention shown in FIGS. 1(A) and (B), a flexible photo-setting resin is applied to one side of the prongs of the fork-shaped brush arms 1, excluding the portions making electrical contact with the commutator, to form a vibration-damping device. This not only guarantees the independent resiliency of each prong 14 of the brush arm 1, but also improves the vibration-absorbing effect. The measurement results of mechanical noises are as shown below.

The measurement values given above are the average values of five measurements of each test piece.

Figure 6A:
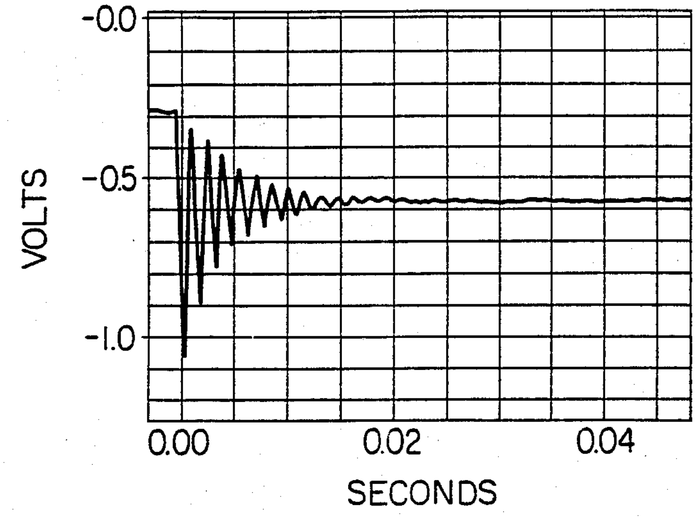
FIG. 6(A) is a diagram illustrating experimental results of a conventional miniature motor.
Figure 6B:
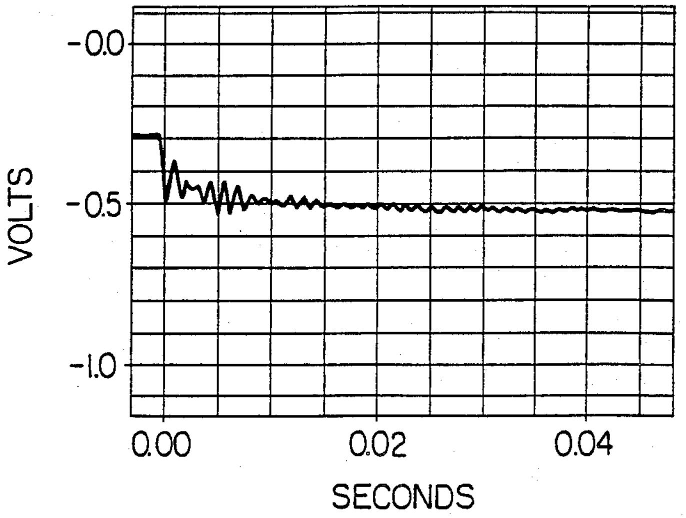
FIG. 6(B) is a diagram illustrating experimental results of a miniature motor according to the present invention.
Figure 7:
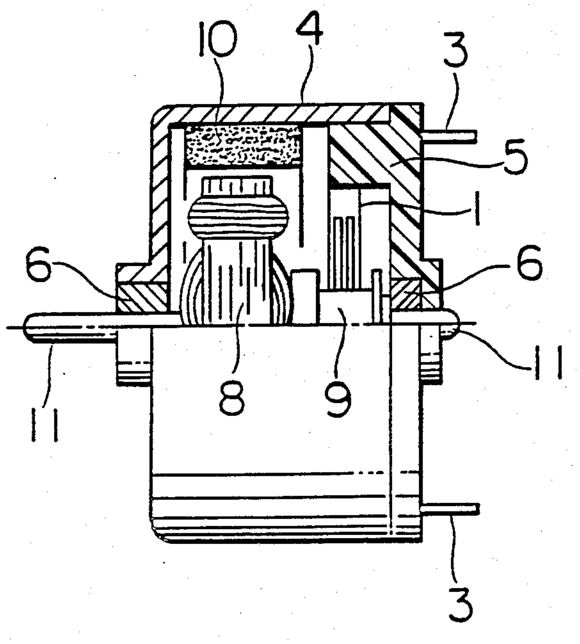
FIG. 7 is a commercially cut-away side elevation view of a miniature motor with a brush arm according to the present invention.

FIG. 6 represents a comparison of vibration-damping effect between the vibration-damping devices of the conventional type and of the present invention; FIG. 6(A) showing the data on the conventional type vibration-damping device, and FIG. 6(B) the data on the vibration-damping device embodying this invention. In the measurement, the vibration exerted on a brush arm, with one end thereof (i.e. a brush base) fixed is detected by a sensor and measured by an oscillograph. The abscissa represents time, and the ordinate the ampltiude of vibration as converted into voltage. As is evident from the figures, the conventional vibration-damping device involves a large initial ampitude and takes longer time until the vibration subsides. The vibration-damping device of this invention, on the other hand, has an initial ampltide that is within an allowable range, showing a satisfactory vibration-damping effect.

Figure 4:
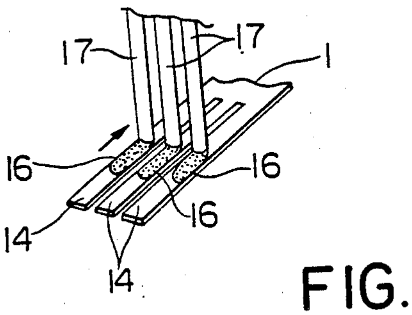
FIG. 4 is a perspective view of a brush arm according to the present invention where a flexible photo-setting resin is automaticaly applied to a brush arm to form a vibration-damping device according to the present invention.

In FIG. 4, numeral 1 refers to a brush arm; 14 to a prong; 16 to a flexible photo-setting resin; 17 to a nozzle, respectively.

The flexible photo-setting rein is in liquid form, and can be set by radiating light rays of 10 to 1,000 m for a few seconds to the object coated with the resin. Furthermore, the coating and setting processes of this resin can be automated. In the embodiment shown in FIG. 4, a controlled amount of the flexible photo-setting resin is automatically fed from a resin feeding device (not shown) and applied to a predetermined area of the brush arm 1 through the nozzles 17 opposing to the corresponding prongs 14 being coated. The flexible photo-setting resin used in this invention is of an anaerobic-setting type which can be set completely even in the absence of air, as in the cases where the resin flowing into gaps comes in contact with metal. Consequently, there is no need for heating and other treatments after application. The second, third and fourth embodiments of this invention shown in FIGS. 5(A), (B), (C) and (D) takes advantage of this feature of the resin. In the figures, numeral 1 refers to a brush arm; 2 to a brush base; 5 to a motor case cover plate; 7 to a brush hole; 14 to a prong; 15 to a flexible photo-setting resin; and 18 to a damper, respectively.

Figure 5A:
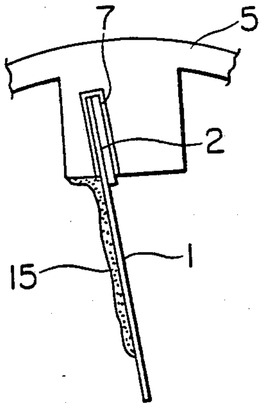
FIG. 5(A) is a section showing a brush arm and support according to a further embodiment of the present invention.

In the second embodiment, shown in FIG. 5(A), a vibration-damping device is formed by applying the flexible photo-setting resin 15 over the entire one-side surface of the brush arm 1, excluding the portion making electrical contact with the commutator, and over the area near the brush hole as well.

Figure 5B:
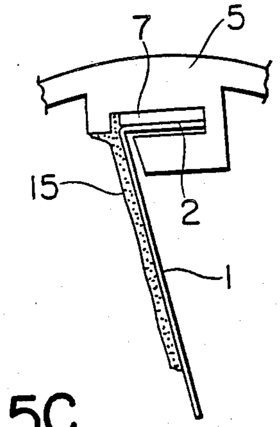
FIG. 5(B) is a section view showing a brush arm and support according to still a further embodiment of the present invention.

In the third embodiment shown in FIG. 5(B), a vibration-damping device is formed over a wider area than in the second embodiment by injecting the flexible photo-setting resin 15 into the brush hole 7.

Figure 5C:
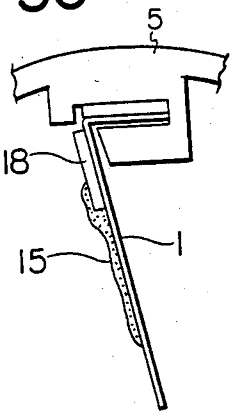
FIG. 5(C) is a section view showing a brush arm in support according to still another embodiment of the present invention.
Figure 5D:
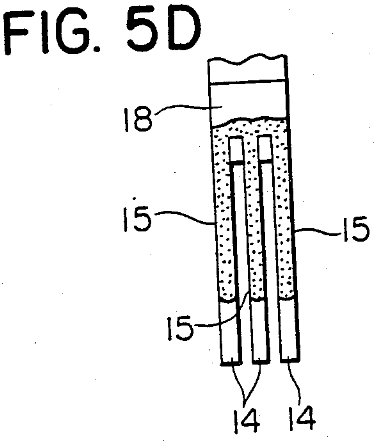
FIG. 5(D) is a section view showing a brush arm in support of still another embodiment of the present invention.

In the fourth embodiment shown in FIGS. 5(C) and (D), a vibration-damping device is formed by applying a damper 18 to the base of the prongs 14 of the fork-shaped brush arm 1 and applying the flexible photo-setting reisn 15 to the prongs 14, including part of the damper 18. In this case, the flexible photo-setting resin may of course be applied to the area near the brush hole 7 or to the inside of the brush hole 7, as in the second and third embodiments shown in FIGS. 5(A) and (B).

As described above, this invention makes it possible to improve the vibration-damping effect (vibration-absorbing effect) against unwanted vibration of the brushes of a miniature motor, while guaranteeing the independent resiliency of the prongs of the fork-shaped brush arms by applying a flexible photo-setting resin to the brush arms. Furthermore, the use of a flexible photo-setting resin, which can be set by radiating light rays for a few seconds, makes it possible to automate the coating and setting processes of the resin.

While specific embodiments of the invention have been shown and described in detail to illustrate the application of the principles of the invention, it will be understood that the invention may be embodied otherwise without departing from such principles.

What is claimed is:

1. In a miniature motor comprising a motor case, a rotor rotatably mounted in said case including a rotatable shaft having a rotor with a commutator rotatable therewith, the improvement comprising a casing wall with a brush receiving recess, and a brush having a fork-shaped brush arm with a fork-shaped commutator engaging sliding part end disposed in bearing contact against said commutator and an opposite brush base end with a portion engaged in the brush receiving recess and held therein so as to hold said brush arm fork-shaped commutator engaging sliding part end in sliding engagement with said commutator, and a flexible photo-setting resin coating said brush at least over said brush base end.

2. In a miniature motor according to claim 1, wherein said flexible photo-setting resin is applied to one side of said fork-shaped brush arm excluding said fork-shaped commutator engaging sliding part end which makes electrical contact with said commutator.

3. In a miniature motor according to claim 1, including a damper on said brush base end, and said flexible photo-setting resin being applied to one side of said brush arm and exluding said fork-shaped commutator engaging sliding part end which makes electrical contact with said commutator, and including covering at least a portion of said damper.

4. In a miniature motor according to claim 1, wherein said photo-setting resin is applied to said brush base end of said brush in an area adjacent said recess in addition to covering an entire single side surface of said brush excluding the portion thereof in contact with said commutator.

5. In a miniature motor comprising a motor case, a rotor rotatably mounted in said case including a rotatable shaft having a rotor with a commutator rotatable therewith, the improvement comprising a casing wall with a brush receiving recess, a brush having a fork-shaped brush arm with a brush fork-shaped commutator engaging a sliding part end disposed in bearing contact against said commutator and an opposite brush base end with a portion engaged in the brush receiving recess and held therein so as to hold said brush arm fork-shaped commutator engaging sliding part end in sliding engagement with said commutator, and a flexible photo-setting resin coating said brush at least over said brush base end, said photo-setting resin is applied to an extended area of said brush adjacent the recess and inside of said excess in addition to an entire single side surface of said brush excluding the portion which is engagement with said commutator.

* * * * *